US006098991A

United States Patent [19]

Onishi

[11] Patent Number: 6,098,991

[45] Date of Patent: Aug. 8, 2000

[54] DIAPHRAGM STOPPER CONSTRUCTION FOR A HIGH-PRESSURE ACCUMULATOR

[75] Inventor: Yoshihiko Onishi, Tokyo, Japan

[73] Assignee: Mitsubishi Denki Kabushiki Kaisha, Tokyo, Japan

[21] Appl. No.: 09/184,016

[22] Filed: Nov. 2, 1998

[30] Foreign Application Priority Data

Apr. 15, 1998 [JP] Japan .................................. 10-105063

[51] Int. Cl.[7] .......................................................... F16J 3/00

[52] U.S. Cl. ............................................. 277/634; 277/641

[58] Field of Search .................................... 277/628, 634, 277/635, 641

[56] References Cited

U.S. PATENT DOCUMENTS

| | | | |
|---|---|---|---|
| 4,253,675 | 3/1981 | St. Laurent, Jr. | 277/634 X |
| 4,936,635 | 6/1990 | Sakaguchi | 277/634 X |
| 5,142,964 | 9/1992 | Suzuki | 277/634 X |
| 5,730,506 | 3/1998 | Friedow et al. . | |

FOREIGN PATENT DOCUMENTS

| | | |
|---|---|---|
| 2-225801 | 9/1990 | Japan . |

*Primary Examiner*—Anthony Knight
*Assistant Examiner*—Karlena D. Schwing
*Attorney, Agent, or Firm*—Sughrue, Mion, Zinn, Macpeak & Seas, PLLC

[57] ABSTRACT

A diaphragm stopper construction for a high-pressure accumulator 100 is provided which causes no damage when the diaphragm 86 deforms even if the fuel is contaminated by foreign matter and the foreign matter is caught in the slight gap 94 between the diaphragm 86 and the plate or wall 101 and deforms the diaphragm 86 as in the conventional design. The diaphragm 86 is supported and sealed by the case 85 and a plate 101, and has a secured portion 104 which is not displaced even if the pressure in the high-pressure chamber 71 fluctuates. In the gentle slope 103 of the plate 101, a rectangular groove 105 is disposed which has a rectangular cross-section and which is an annular recess portion formed around the circumference of the plate 101 in close proximity to and radially inside the innermost secured edge S of the secured portion 104, such that even if the diaphragm 86 is displaced and comes into contact with the gentle slope 103 of the plate 101, foreign matter can be received. The annular recess portion may also be a terraced recess portion 125.

6 Claims, 5 Drawing Sheets

DIAPHRAGM STOPPER CONSTRUCTION FOR A HIGH-PRESSURE ACCUMULATOR

BACKGROUND OF THE INVENTION

1. Field of the Invention

The present invention relates to a diaphragm stopper construction for a high-pressure accumulator which defines the limit of deformation of a flexible disk-shaped metal diaphragm disposed in a high-pressure vessel which supports and seals the perimeter portion of the metal diaphragm to form a high-pressure chamber.

2. Description of the Related Art

Diesel engines are the most widely known of the so-called "cylinder-injected" or "direct injection engines", engines in which fuel is injected into the engine cylinder, but in recent years cylinder-injected spark ignition engines (gasoline engines) have also been proposed. Cylinder-injected engines of this kind demand that fuel pressure surges be minimized to maintain sufficiently high fuel injection pressure and ensure stable injection. To this end, compact single-cylinder high-pressure fuel pumps have been proposed which are of simple construction and inexpensive to manufacture. However, because there is only one plunger in the single-cylinder system, there are surges of quite some amplitude in the pressure of the fuel discharged, and so surge absorption devices with metal bellows or diaphragms have been proposed to absorb these surges.

FIG. 5 shows a high-pressure fuel supply system provided with a high-pressure accumulator which is a useful example of a surge absorption device to which the present invention can be applied. In FIG. 5, a delivery pipe 1, which is a fuel injection apparatus, is provided with a plurality of injectors 1*a* corresponding to the number of engine cylinders, which are not shown. A high-pressure fuel pump assembly 200 provided with a high-pressure fuel pump 3 is disposed between the delivery pipe 1 and a fuel tank 2. The delivery pipe 1 and the high-pressure fuel pump 3 are connected by a high-pressure fuel passage 4 and the high-pressure fuel pump 3 and the fuel tank 2 are connected by a low-pressure fuel passage 5. Together, the high-pressure fuel passage 4 and the low-pressure fuel passage 5 compose a fuel passage connecting the delivery pipe 1 to the fuel tank 2. A filter 6 is disposed in the fuel intake of the high-pressure fuel pump 3 to prevent contamination by foreign matter above a certain size downstream from the fuel supply system, i.e., the high-pressure fuel pump 3, high-pressure accumulator 70, etc. A check valve 7 is disposed on the fuel discharge side of the high-pressure fuel pump 3. A drain 8 attached to the high-pressure fuel pump 3 returns to the fuel tank 2.

A low-pressure fuel pump 10 is disposed at the end of the low-pressure fuel passage 5 close to the fuel tank 2. A filter 11 is disposed in the fuel intake of the low-pressure fuel pump 10. A check valve 12 is disposed in the low-pressure fuel passage 5 on the fuel discharge side of the low-pressure fuel pump 10. A low-pressure regulator 14 is disposed in the low-pressure fuel passage 5 between the high-pressure fuel pump 3 and the low-pressure fuel pump 10. A filter 15 is disposed in the fuel intake of the low-pressure regulator 14. A drain 16 attached to the low-pressure regulator 14 returns to the fuel tank 2.

The high-pressure fuel pump 3 increases the pressure of the fuel supplied to it by the low-pressure fuel passage 5 and discharges it to the delivery pipe 1. A dumper 30 is disposed on the low-pressure fuel passage S side of the high-pressure fuel pump 3, i.e., the low-pressure side. A high-pressure accumulator 70 and a high-pressure regulator 32 are disposed on the high-pressure side of the high-pressure fuel pump 3. A drain 33 attached to the high-pressure regulator 32 returns to the fuel input side of the high-pressure fuel pump 3.

FIG. 6 is a cross-section showing details of the high-pressure fuel pump assembly 200 when fully assembled, comprising the high-pressure fuel pump 3, dumper 30, high-pressure accumulator 70, high-pressure regulator 32, filter 6, and check valve 7. In FIG. 6, a recess portion 40*c* is formed in the casing 40 on the right-hand side of the diagram, and the high-pressure accumulator 70 is secured to the recess portion 40*c*. A discharge passage 4*b* which communicates with a discharge passage 4*a* is formed as a recess in the bottom of the recess portion 40*c*.

FIG. 7 is a cross-section showing details of the high-pressure accumulator 70, which is a surge absorption device to which the present invention can be applied, and its fitted construction. The high-pressure accumulator 70 is provided with a case 85, which is a high-pressure vessel roughly the shape of a thick disk, a flexible disk-shaped metal diaphragm 86, supported by and sealed against the case 85 around its perimeter portion so that together they form a high-pressure chamber 71, and a disk-shaped plate 89, which is a stopper defining the limit of deformation of the diaphragm 86.

The case 85 has a comparatively thin perimeter portion 72, which supports and seals the outer perimeter portion of the diaphragm 86 by a sealing weld, and a comparatively thick central portion 73, in which the high-pressure chamber 71 is formed. A male thread 91 is formed on the cylindrical outer surface of the peripheral portion 72, and a comparatively shallow saucer-shaped recess portion 74, which gradually deepens from the perimeter portion towards the central portion in a smooth curve to allow the diaphragm 86 to deform towards the high-pressure chamber 71, is formed in the portion in close contact with the diaphragm 86. An approximately-cylindrical recess portion 75, which communicates with the shallow saucer-shaped recess portion 74 at the central portion, is formed in the central portion 73 and, together with the saucer-shaped recess portion 74, forms the high-pressure chamber 71.

A gas charge inlet 84 of circular cross-section about its central axis is formed in the ceiling portion of the high-pressure chamber 71 to introduce high-pressure gas to the high-pressure chamber 71 of the case 85 and seal it in, and a sealing device 87 is disposed therein to seal the gas charge inlet 84. The gas charge inlet 84 is provided with a small-diameter portion 76 of comparatively small diameter on the high-pressure side facing the high-pressure chamber 71, and a large-diameter portion 77 of comparatively large diameter on the low-pressure side facing the exterior of the case 85. A shoulder portion 78 is formed between the small-diameter portion 76 and the large-diameter portion 77, and a female thread is formed on the inner surface of the small-diameter portion 76. An annular groove 79 is disposed in the shoulder portion 78 to accommodate an O-ring 88.

The sealing device 87 is a plug member inserted into the described gas charge inlet 84 and has a large-diameter portion 81, which is inserted into the large-diameter portion 77 of the gas charge inlet 84, and a small-diameter portion 80, which has a thread around its outside surface which engages the female thread of the small-diameter portion 76, and the large-diameter portion 81 inserted into the gas charge inlet 84 presses on the O-ring 88 and seals the gas charge inlet 84.

The perimeter portion of the diaphragm 86 is sealed and supported on the outer perimeter portion of the case 85 by a weld portion 82 made by an electron beam or the like, but in addition a saucer-shaped plate 89 is disposed on the diaphragm 86 as a stopper to define the limit of deformation of the diaphragm 86, and the plate 89 is also fastened around its circumference by the weld portion 82. A recess portion 83 shaped like one side of a convex lens is formed on the inner face of the plate 89, which gradually deepens from the outer perimeter portion of the diaphragm 86 towards the center, and communicating holes 90 are formed as fuel channels which communicate with the recess portion 83.

The case 85, the metal diaphragm 86, and the plate 89 are all hermetically sealed and bonded to each other around their outer perimeter portions by welding with an electron beam, or the like. The space sealed between the metal diaphragm 86 and the case 85 is charged with a high-pressure gas such as nitrogen.

A male thread 91 formed around the outside of the case 85 engages a corresponding female thread formed in the recess portion 40*c*, and the high-pressure accumulator 70 is inserted into the plate 89, sealed by an O-ring 51, and secured to the recess portion 40*c* so as to allow the communicating holes 90 to communicate with the discharge passage 4*b*. As it is being secured, the male thread 91 engages the thread in the case 40, and at the same time, the end surface 92 of the plate 89 of the high-pressure accumulator 70 and the O-ring 51 slide past each other around the circumference of the O-ring 51 and generate friction. The high-pressure accumulator 70 is secured to the case 40, and a seal is formed between the end surface 92 and the O-ring 51.

The high-pressure accumulator 70 constructed in this way, absorbs surges in the pressure of the fuel discharged by the discharge passage 4*b*. That is, while fuel is being discharged through the discharge passage 4*b*, surges occur in the discharge passage 4*b*, for example, when the high-pressure fuel pump is operating. The volume of the high-pressure chamber 71 varies in response to changes caused by the surges until the pressure of the high-pressure gas in the high-pressure chamber 71 reaches equilibrium with the pressure in the discharge passage 4*b* through the diaphragm 86. For example, when the pressure in the discharge passage 4*b* rises, the diaphragm 86 is deformed such that the volume of the high-pressure chamber 71 decreases and the volume of the discharge passage 4*b* increases, and so the pressure in the discharge passage 4*b* decreases and surging is reduced.

When an engine stops, the supply of fuel from the high-pressure fuel pump 3 also stops, and the fuel pressure in the lens-shaped recess 83 on the plate 89 side gently decreases. For that reason, the diaphragm 86 is displaced from its position during normal operation shown in the diagram due to the pressure of the gas in the high-pressure chamber 71, but to prevent damage and wear on the diaphragm 86, a diaphragm stopper construction is employed having a curve such that when the diaphragm deforms a certain amount, it comes into contact with the surface of curve of the lens-shaped recess 83 on the plate 89 and does not deform any further, and thus excessive stress does not concentrate on the diaphragm 86.

In a conventional accumulator, when the engine stops the diaphragm 86 comes into contact with the stopper surface 93, which is the curve of the lens-shaped recess 83 on the plate 89, which is in turn the construction of the diaphragm stopper, due to the pressure of the gas in the high-pressure chamber 71. As shown in FIG. 8, at this time, if foreign matter 95 has contaminated the fuel in the lens-shaped recess 83, there is a risk that the foreign matter 95 may be caught between the diaphragm 86 and the plate 89, deform the diaphragm 86 and cause damage. It is particularly difficult for a stream to form in the region between the communicating holes 90, which are fuel channels, and the secured portion on the perimeter portion of the diaphragm 86, which is sealed and supported, and in the immediate vicinity of the secured edge S, which is the most extreme inner edge, the gap 94 between the diaphragm 86 and the stopper surface 93 of the plate 89 is small, and so if foreign matter 95 gets caught in the gap 94, it is unlikely to be expelled to the portion of the lens-shaped recess 83 where the gap is wider, increasing the likelihood of deformation or damage to the diaphragm 86 due to the catching of foreign matter.

Also, as shown in FIG. 5, a filter 6 is disposed on the upstream side of the high-pressure accumulator 70 to prevent the passage downstream of matter above a certain size. However, foreign matter below a certain size passes through the filter 6, and so contamination of the lens-shaped recess 83 of the high-pressure accumulator 70 by foreign matter below a certain size through the discharge passage 4*b* and communicating holes 90 together with fuel cannot be avoided.

SUMMARY OF THE INVENTION

Consequently, an object of the present invention is to provide a diaphragm stopper construction for a high-pressure accumulator which prevents deformation or damage to a diaphragm due to the catching of foreign matter.

In the present invention, a diaphragm stopper construction for a high-pressure accumulator having a gentle slope which defines the limit of deformation of a flexible disk-shaped metal diaphragm disposed in a high-pressure vessel which supports and seals the perimeter portion of the diaphragm to form a high-pressure chamber therebetween, is provided with an annular recess portion defined in the gentle slope to extend in close proximity to, parallel to, and radially inside of the secured portion of the perimeter portion of the diaphragm.

Also, the present invention is characterized in that the high-pressure accumulator may be disposed downstream of a filter and the annular recess portion may have a cavity capable of receiving foreign matter of the size which passes through the filter.

Also, the present invention is characterized in that the annular recess portion may be a groove of a substantially rectangular cross-section.

Also, the present invention is characterized in that the annular recess portion may have a substantially terraced cross-section having a flat surface substantially parallel to the secured portion of the diaphragm and a wall positioned at the outer edge of the flat surface which rises up gently at an angle from the flat surface.

DETAILED DESCRIPTION OF THE PREFERRED EMBODIMENTS

Embodiment 1

Figure 1:
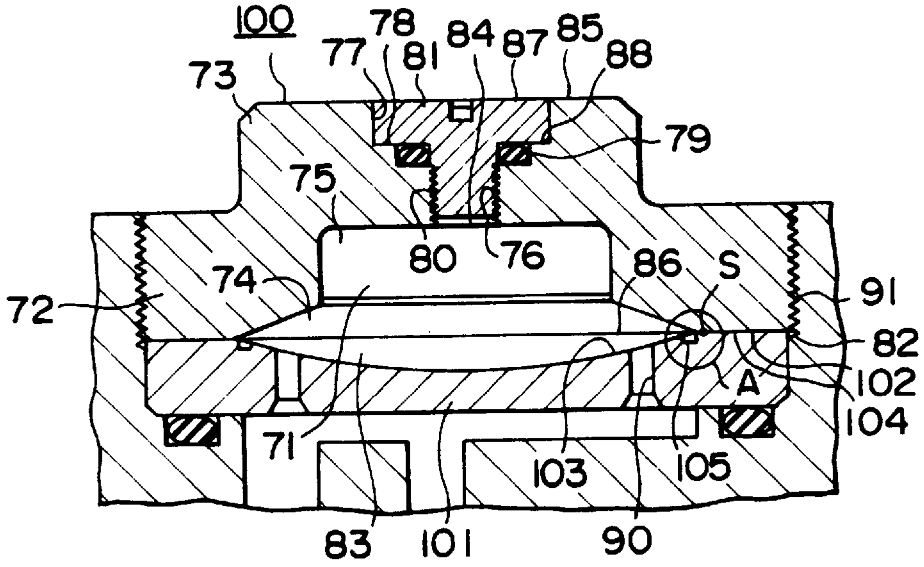
FIG. 1 is a cross-section of the high-pressure accumulator and its fitted construction according to Embodiment 1 of the present invention.
Figure 2:
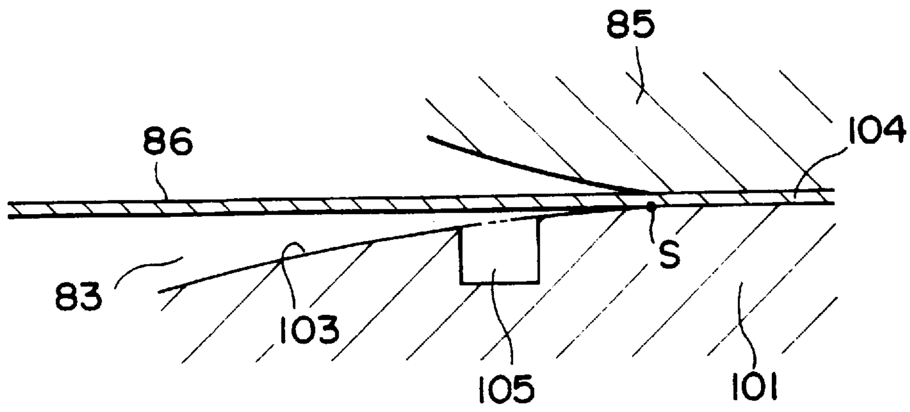
FIG. 2 is an enlargement of the portion A of FIG. 1.

FIG. 1 shows a cross-section of the high-pressure accumulator 100 and its fitted construction to which a stopper construction which is an embodiment of the present invention has been applied. FIG. 2 is an enlargement of the portion A in FIG. 1. Apart from the shape of the plate 101, the rest of the construction in FIG. 1 is the same as in FIG. 5 and further explanation of the same portions will be omitted.

In FIG. 1, a gentle slope 103 which defines the limit of deformation of a flexible disk-shaped metal diaphragm 86 disposed in a case 85 which is a high-pressure vessel which supports and seals the perimeter portion 102 of the diaphragm 86 to form a high-pressure chamber 71 performs the function of a diaphragm stopper for a high-pressure accumulator 100.

In FIG. 2, the diaphragm 86 is supported and sealed by the case 85 and a plate 101 and has a secured portion 104 which forms a roughly doughnut-shaped flat surface which is not displaced even if the pressure in the high-pressure chamber 71 fluctuates. In the gentle slope 103 of the plate 101, a rectangular groove 105 is disposed which has a rectangular cross-section 1 mm or less wide and which is an annular recess portion formed around the circumference of the plate 101 in close proximity to and radially inside the innermost secured edge S of the secured portion 104, for example, at a position 2 mm inside from S.

The size of the rectangular groove 105 is determined by the size of the foreign matter contained in the fuel which flows into the recess portion 83. In other words, the size of the rectangular groove 105 is determined such that even if the diaphragm 86 is displaced and comes into contact with the gentle slope 103 of the plate 101, foreign matter can be received in the rectangular groove 105.

Figure 5:
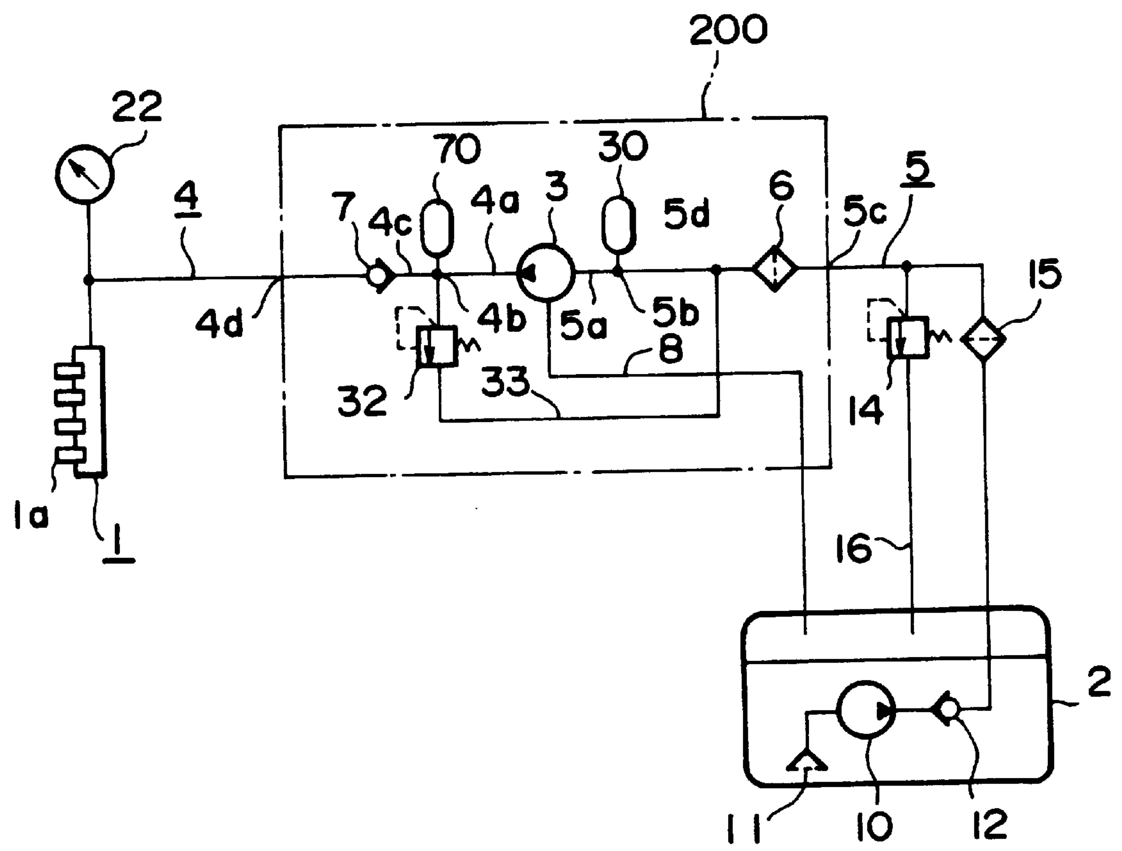
FIG. 5 is a system diagram of a high-pressure fuel supply system provided with a high-pressure accumulator to which the present invention can be applied.
Figure 6:
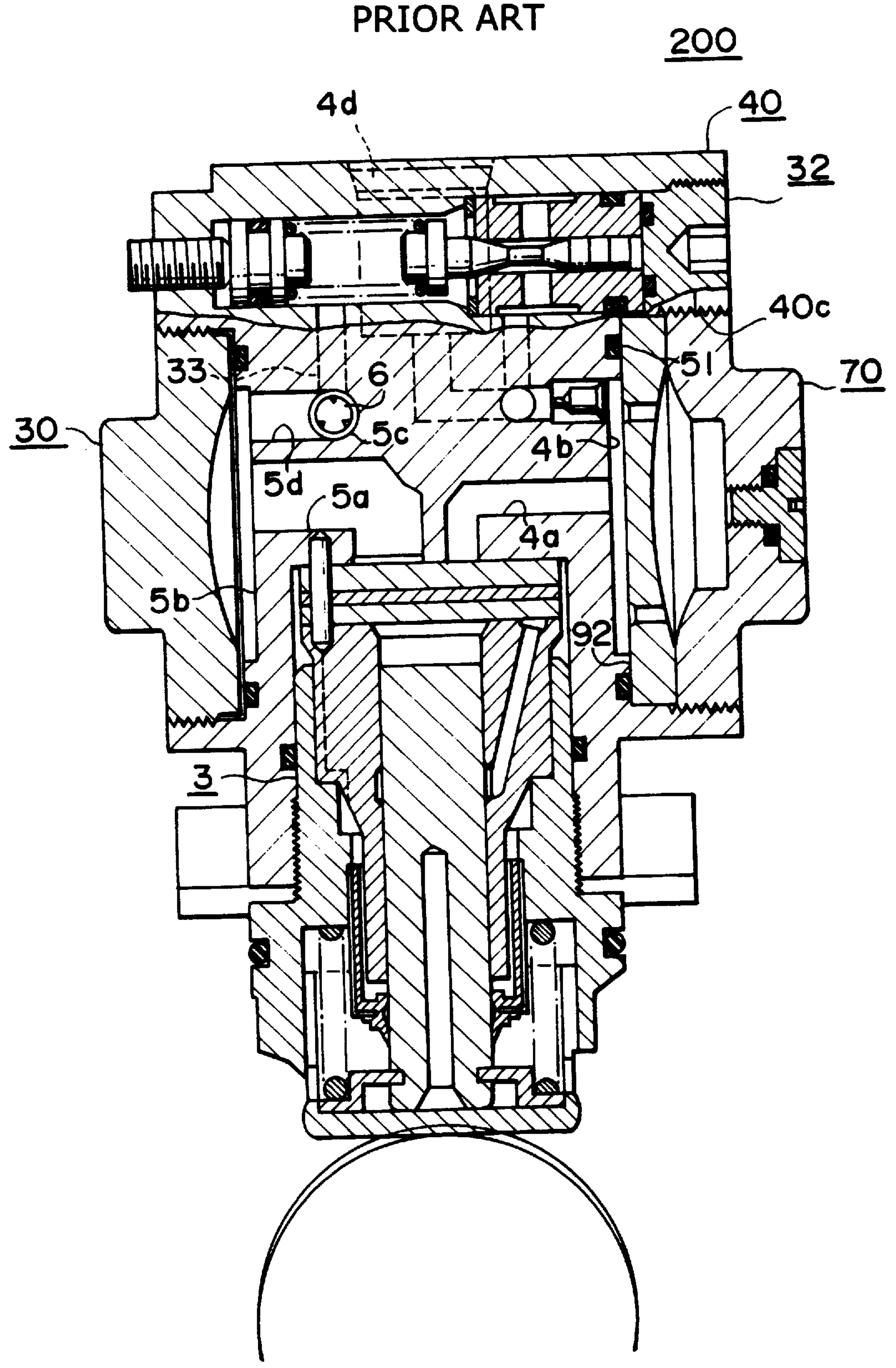
FIG. 6 PRIOR ART
FIG. 6 is a cross-section of the high-pressure fuel pump assembly in FIG. 5.
Figure 7:
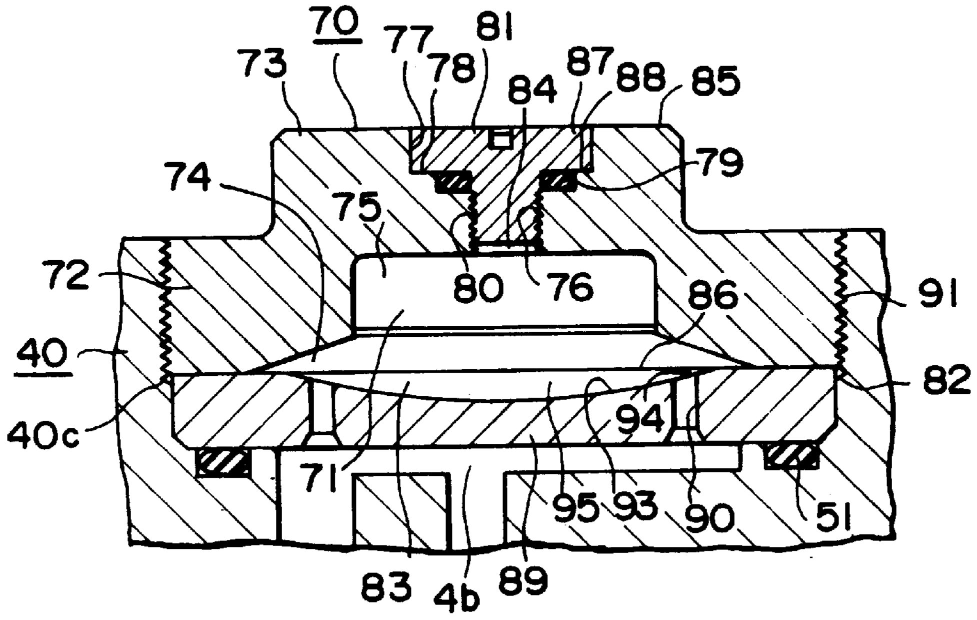
FIG. 7 PRIOR ART
FIG. 7 is a cross-section of a high-pressure accumulator and its fitted construction.
Figure 8:
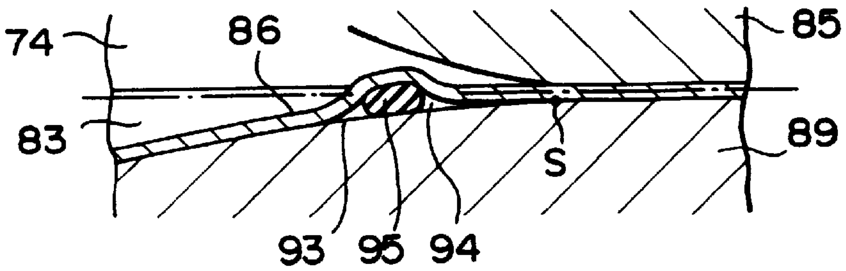
FIG. 8 PRIOR ART
FIG. 8 shows foreign matter caught between a diaphragm and a plate.

The size of the rectangular groove 105 can also be determined by the size of the mesh which sets the limit of filtration of the filter 6 upstream from the high-pressure accumulator 70 to which the present invention can be applied, in the fuel supply passage shown in FIG. 5.

For example, if the size of the mesh is approximately 30 $\mu$m, the size of the rectangular groove 105 can be set in consideration of contamination by foreign matter of approximately 30 $\mu$m or less.

In the diaphragm stopper construction for a high-pressure accumulator 100 composed in this manner, even if the fuel is contaminated by foreign matter, the foreign matter is received in the rectangular groove 105, so that no damage is caused by the foreign matter which is caught in the slight gap 94 between the diaphragm 86 and the plate 101 and which deforms the diaphragm 86 as in the conventional design.

Embodiment 2

Figure 3:
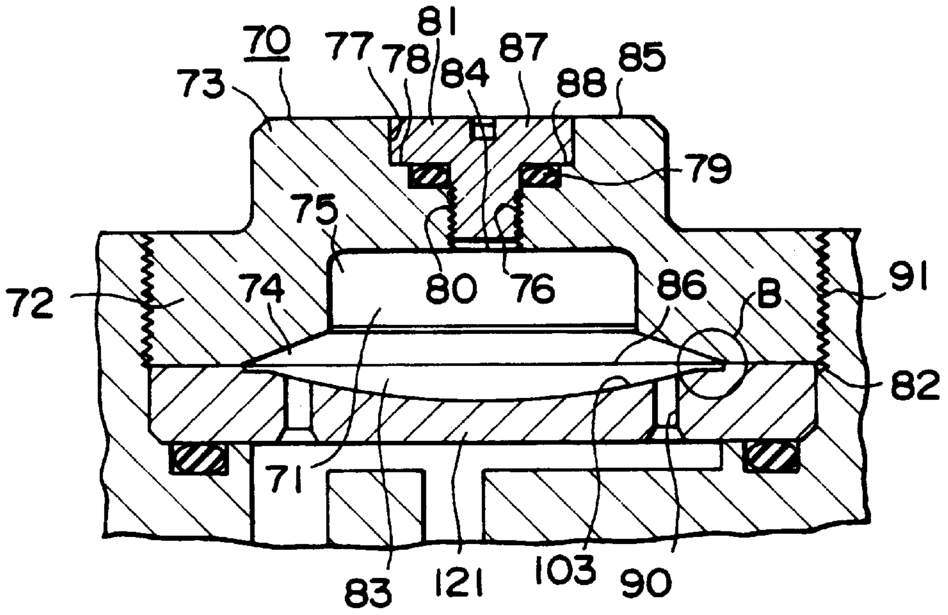
FIG. 3 is a cross-section of the high-pressure accumulator and its fitted construction according to Embodiment 2 of the present invention.
Figure 4:
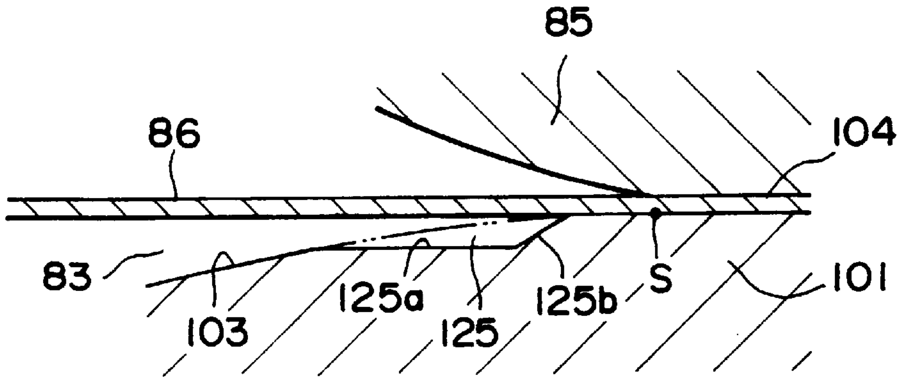
FIG. 4 is an enlargement of the portion B of FIG. 3.

FIG. 3 shows a cross-section of the high-pressure accumulator 100 and its fitted construction to which a stopper construction which is an embodiment of the present invention has been applied. FIG. 4 is an enlargement of the portion B in FIG. 3. Apart from the shape of the plate 121, the rest of the construction in FIG. 3 is the same as that shown in FIG. 1 and further explanation of the same portions will be omitted.

While the groove 105 disposed in the gentle slope 103 in FIG. 2 has a rectangular cross-section, this embodiment shown in FIG. 4 has a terraced recess portion 125 disposed in a gentle slope 123.

The terraced recess portion 125 comprises a flat surface 125*a* substantially almost parallel to the secured portion 104 of the diaphragm 86 and a wall 125*b* disposed on the outer edge of the flat surface 125*a* which rises up gently at an angle from the flat surface 125*a*. The wall 125*b* is positioned in close proximity to and radially inside the innermost secured edge S of the secured portion 104.

In the diaphragm stopper construction for a high-pressure accumulator 100 composed in this manner, even if the fuel is contaminated by foreign matter, the foreign matter is received in the terraced recess portion 125, and no damage is caused by the foreign matter which in the conventional design may be caught in the slight gap found between the diaphragm 86 and the plate 121 when the diaphragm 86 deforms.

Also, after the engine starts and the diaphragm 86 is no longer in contact with the plate 121, the foreign matter which has entered the terraced recess portion 125 is easily expelled.

In addition, the terraced recess portion 125 can be simultaneously formed in the machining process which forms the gentle slope of the plate 121.

As is clear from the above explanation, in accordance with the present invention, a diaphragm stopper construction for a high-pressure accumulator having a gentle slope which defines the limit of deformation of a flexible disk-shaped metal diaphragm disposed in a high-pressure vessel which supports and seals the perimeter portion of the diaphragm to form a high-pressure chamber therebetween, is provided with an annular recess portion difined in the gentle slope to extend in close proximity to, parallel to, and radially inside of the secured portion of the perimeter portion of the diaphragm, and so even if the fuel is contaminated by foreign matter, the foreign matter is received in the rectangular groove, so that no damage is caused by the foreign matter which is caught in the slight gap between the diaphragm and the plate and which deforms the diaphragm as in the conventional design.

Also in accordance with the present invention, the high-pressure accumulator is disposed downstream of a filter and the annular recess portion has a cavity capable of receiving foreign matter of the size which passes through the filter, and so by providing a cavity appropriate to the size of the foreign matter which is contained in the fuel and flows into the high-pressure accumulator, it is possible to effectively prevent the catching of foreign matter by the diaphragm.

Also in accordance with the present invention, the annular recess portion has a substantially terraced shape having a flat surface substantially parallel to the secured portion of the diaphragm and a wall positioned at the outer edge of the flat surface which rises up from the flat surface, and so, in addition to the above effects, when the diaphragm is no longer in contact, the foreign matter which has entered the recess portion is easily expelled from the recess portion. Also, the recess portion can be simultaneously formed in the machining process which forms the gentle slope of the plate.

What is claimed is:

1. A diaphragm stopper wall for, and in combination with, a high pressure accumulator, said wall defining a generally concave, gentle slope which limits a deformation of a flexible disk-shaped metal diaphragm disposed in a high-pressure vessel which supports and seals a perimeter portion of said diaphragm to form a high-pressure chamber therebetween, comprising means for preventing an unwanted deformation of and damage to said diaphragm caused by the presence of foreign matter lodged between said diaphragm and said stopper wall said preventing means comprising an annular recess defined in said gentle slope and extending in close proximity to, parallel to, and radially inwardly of said perimeter portion of said diaphragm for accommodating said foreign matter.

2. The diaphragm stopper wall and high-pressure accumulator combination according to claim 1, characterized in that said high-pressure accumulator is disposed downstream of a filter and said annular recess portion has a cavity capable of receiving foreign matter of a size which passes through said filter.

3. The diaphragm stopper wall and high pressure accumulator combination according to claim 2, characterized in that said annular recess portion is a groove of a substantially rectangular cross-section.

4. The diaphragm stopper wall and high pressure accumulator combination according to claim 2, characterized in that said annular recess portion has a substantially terraced cross-section having a flat surface substantially parallel to a secured portion of said diaphragm and a wall positioned at the outer edge of said flat surface which rises up gently at an angle from said surface.

5. The diaphragm stopper wall and high-pressure accumulator combination according to claim 1, characterized in that said annular recess portion is a groove of substantially rectangular cross-section.

6. The diaphragm stopper wall and high pressure accumulator combination according to claim 1, characterized in that said annular recess portion has a substantially terraced cross-section having a flat surface substantially parallel to a secured portion of said diaphragm and a wall positioned at the outer edge of said flat surface which rises up gently at an angle from said flat surface.

* * * * *